(12) United States Patent
Lalanne

(10) Patent No.: US 12,352,503 B2
(45) Date of Patent: Jul. 8, 2025

(54) THERMOELECTRIC DEVICE FOR STORAGE OR CONVERSION OF ENERGY

(71) Applicant: Pascal Lalanne, Dinard (FR)

(72) Inventor: Pascal Lalanne, Dinard (FR)

( * ) Notice: Subject to any disclaimer, the term of this patent is extended or adjusted under 35 U.S.C. 154(b) by 91 days.

(21) Appl. No.: 18/011,095

(22) PCT Filed: Jun. 19, 2020

(86) PCT No.: PCT/IB2020/055815
§ 371 (c)(1),
(2) Date: Dec. 16, 2022

(87) PCT Pub. No.: WO2020/255086
PCT Pub. Date: Dec. 24, 2020

(65) Prior Publication Data
US 2023/0243599 A1    Aug. 3, 2023

(51) Int. Cl.
| | |
|---|---|
| F28D 17/00 | (2006.01) |
| F03B 13/06 | (2006.01) |
| F28D 20/00 | (2006.01) |
| F28D 20/02 | (2006.01) |
| F24T 50/00 | (2018.01) |
| H02J 15/00 | (2006.01) |

(52) U.S. Cl.
CPC .......... *F28D 20/0034* (2013.01); *F03B 13/06* (2013.01); *F28D 20/02* (2013.01); *F24T 50/00* (2018.05); *H02J 15/003* (2013.01)

(58) Field of Classification Search
CPC ...... F28D 20/0034; F28D 20/02; F03B 13/06; F24T 50/00; H02J 15/003
USPC .......................................................... 165/10
See application file for complete search history.

(56) References Cited

U.S. PATENT DOCUMENTS

| | | | |
|---|---|---|---|
| 4,199,021 | A | 4/1980 | Thoma |
| 4,251,291 | A | 2/1981 | Gomez |
| 5,269,146 | A | 12/1993 | Kerner |
| 5,737,923 | A | 4/1998 | Gilley et al. |

(Continued)

FOREIGN PATENT DOCUMENTS

| | | |
|---|---|---|
| CN | 102278835 B | 2/2015 |
| CN | 105927390 A | 9/2016 |

(Continued)

OTHER PUBLICATIONS

Ayop et al. "The design of energy storage based on thermoelectric generator and bidirectional converter" International Journal of Power Electronics and Drive Systems(IJPEDS)vol. 13, No. 3, Sep. 2022, pp. 1605~1613 Link: https://zenodo.org/record/6960740#.ZBFwFHZBw2w.

(Continued)

*Primary Examiner* — Davis D Hwu
(74) *Attorney, Agent, or Firm* — Maschoff Brennan (57) ABSTRACT

Embodiments of the present disclosure relate to a device for thermoelectric storage that may include main pressurized tanks that may contain hydraulic fluid, propellant fluid, and liquid communications. Further, the pressurized tanks may be equipped with hydroelectric conversion assemblies and heat exchange systems. In some embodiments, the device may include mobile physical separations between fluids, hot or cold thermal reserves, and secondary tanks equipped with pipes.

17 Claims, 6 Drawing Sheets

(56) References Cited

U.S. PATENT DOCUMENTS

| | | |
|---|---|---|
| 7,100,369 B2 | 9/2006 | Yamaguchi |
| 7,405,013 B2 | 7/2008 | Yang et al. |
| 7,752,852 B2 | 7/2010 | Akei et al. |
| 8,286,424 B2 | 10/2012 | Prior et al. |
| 9,293,680 B2 | 3/2016 | Poliquin et al. |
| 9,590,160 B2 | 3/2017 | Dell et al. |
| 10,208,990 B2 | 2/2019 | Petrovski et al. |
| 10,900,667 B2 | 1/2021 | Field et al. |
| 2010/0313926 A1 | 12/2010 | Sun et al. |
| 2012/0042640 A1 | 2/2012 | Limbeck et al. |
| 2012/0042643 A1 | 2/2012 | Lebas et al. |
| 2012/0073276 A1 | 3/2012 | Meisner et al. |
| 2012/0102933 A1 | 5/2012 | Stefan et al. |
| 2013/0061900 A1 | 3/2013 | Tachibana |
| 2013/0186448 A1 | 7/2013 | Ranalli et al. |
| 2014/0060051 A1 | 3/2014 | Ohler et al. |
| 2016/0003501 A1 | 1/2016 | Oh et al. |
| 2016/0025111 A1 | 1/2016 | Kenway et al. |
| 2016/0035957 A1 | 2/2016 | Casey |
| 2018/0138383 A1 | 5/2018 | Lang |
| 2018/0240957 A1 | 8/2018 | Boukai et al. |

FOREIGN PATENT DOCUMENTS

| | | | |
|---|---|---|---|
| CN | 105378954 B | | 12/2017 |
| CN | 106537621 B | | 12/2018 |
| DE | 102004047290 A1 | | 5/2005 |
| DE | 102011018679 A1 | | 10/2012 |
| DE | 112013000620 T5 | | 10/2014 |
| DE | 102014118572 A1 | | 1/2016 |
| DE | 102014218727 A1 | | 3/2016 |
| DE | 102011114102 B4 | | 8/2016 |
| FR | 3082559 A1 | * | 12/2019 |
| FR | 3097593 A1 | * | 12/2020 |
| FR | 3097593A1 TR | * | 12/2020 |
| JP | H0817481 A | | 1/1996 |
| JP | 6611727 B2 | | 11/2019 |
| KR | 101761176 B1 | | 7/2017 |
| TW | 201043783 A | | 12/2010 |
| WO | 2010128222 A2 | | 11/2010 |

OTHER PUBLICATIONS

Li et al. "Thermal performance of two heat exchangers for thermoelectric generators" Case Studies in Thermal Engineering; vol. 8, Sep. 2016, pp. 164-175 Link: https://www.sciencedirect.com/science/article/pii/S2214157X16300417.

Kim et al. "Isothermal transcritical CO2 cycles with TES (thermal energy storage) for electricity storage" Energy vol. 49, Jan. 1, 2013, pp. 484-501 https://doi.org/10.1016/j.energy.2012.09.057.

* cited by examiner

THERMOELECTRIC DEVICE FOR STORAGE OR CONVERSION OF ENERGY

DEFINITION. In the use of the word "Hot" used as a noun, it is meant the energy corresponding to the needs of heat inputs for external users, or corresponding to heat inputs to hot thermal reserves, of temperatures equal to or higher than the ambient temperature. In the use of the word "Cold" used as a noun, it is meant the energy corresponding to heat extraction needs to be ceded by external users, or corresponding to heat extractions from cold thermal reserves, temperatures equal to or lower than ambient temperature. In the use of the words "propellant fluid" it is meant a fluid which has the function of exerting pressure but also meant that this fluid includes a heat exchange function; In articles dealing with thermodynamics, it is the expression "working fluid", often circulating but here non-circulating, which is generally used to define what this document calls "propellant fluid". In the use of the words "thermoelectric storage", we mean a mode of storage of electricity based on the creation of a thermal reserve of hot matter or a thermal reserve of cold matter, or often both, and on the conversion of this thermal energy into mechanical energy and finally into electricity. In the word "turbining" it is meant the action of converting hydraulic energy into mechanical energy or electrical energy by one or more hydraulic driving machines (turbine, piston, rotor, screw, etc.). In the use of the word "evaporator", we mean a heat exchange system providing heat to the system from a heat source. In the use of the word "condenser", we mean a heat exchange system extracting heat from the system toward a heat absorber/sink. It is specified that some heat exchange equipment can successively perform the two functions of "evaporator" and "condenser". In the abbreviation "MPT", we mean main pressurized tank or, in a plurality context, main pressurized tanks.

Technical Domain

With the increasing production of intermittent renewable energies arises in most countries the problem of energy storage as well as the problem of converting renewable electricity to Cold and Hot as well as the opportunity for reverse conversion.

The present invention relates to a hybrid energy storage or conversion device for storing, producing or moving thermal or electrical energy.

State of the Previous Art

In addition to the gravity-based hydroelectric energy storage systems widely used in mountain areas, hydropneumatic storage systems have been invented in recent decades, whereby Earth's gravity is replaced by the pressure of a propellant gas. These devices consist of a sealed tank containing hydraulic fluid pressurized by a propellant gas.

The previously known devices are ingenious in that they make it possible to use the well-proven equipment of the hydroelectric industry such as pumps, motors, turbines, generators, etc. while overcoming the steep drops of hundreds of meters generally needed for the storage of hydraulic energy by gravity (pumped hydro). The ingenuity of the systems lies in the fact that, in the sealed tank, each bar of propellant gas pressure produces the same work, at the level of the hydraulic pump and the hydraulic turbine, as about ten meters of difference in level (for example 75 bar of pressure of the propellant gas produces the same effect as 735 meters of difference in level, when the hydraulic fluid is water).

Such systems have therefore been presented, sometimes in configurations in which the tight tank(s) are above ground, sometimes consisting of sections of gas pipelines designed to withstand pressures of 150 Bar, and also in configurations where these tanks are buried flush below the surface of the ground to save outdoor space, and also presented in configurations where these reservoirs consist of salt domes, ancient mines, or underground caverns, or underwater reservoirs. These caverns are either natural or artificial and in the second alternative could advantageously be placed under cliffs, under hills or even under constructions of heavy mass.

Similarly were presented configurations in which the basin(s) receiving the hydraulic fluid are above the ground, and also configurations where these basins are buried flush below the surface of the ground, and finally configurations where these basins are made up of underground caverns, natural or artificial, generally put at atmospheric pressure. In addition, the basin(s) receiving the hydraulic fluid is sometimes simply a natural body of water such as a pond, lake, river, sea or ocean. The hydraulic fluid is then fresh water or salt water from this body of water.

SUMMARY OF INVENTION

The invention relates to a new hybrid energy storage or conversion system. The device object of the invention provides a thermoelectric storage solution, including elements of hydroelectric pumped storage, including storage in thermal reserves, including the conversion of electricity into thermal energy as well as the conversion of thermal energy into electricity.

Technical Problem

In pure hydropneumatic storage, the limitations of the above systems are of four concomitant natures, related to the thermodynamic characteristics of the gases, responding roughly to the well-known formula $P.V=n.R.T$ of perfect gases. The first limitation is the heating of the gas during compression, the second limitation the cooling of the gas during expansion, the third limitation is the large portion of the tank, preferably greater than 50%, which should be reserved for the pressurized gas alone, and the fourth limitation is that the storable energy is only equal, before factoring-in the loss of efficiency, to the integral of the liquid $P.dV$ on the volume of liquid, and not to liquid $P.V$.

Alternatively, in addition to a large number of purely pneumatic gaseous air compression storage systems (CAES and AACAES), some other hydropneumatic systems were presented, by which the hydraulic fluid is instead a means, mainly closed, of converting the potential energy of compressed air into mechanical energy. Fresh air is newly incorporated into the system in each cycle and then lost. The major disadvantage of these systems lies in the inevitable temperature differences during compressions and expansions, which greatly affect the efficiency of energy storage.

Alternatively, an interesting French hydropneumatic system entitled «Procédé et équipements de stockage d'énergie mécanique par compression et détente quasi-isotherme d'un gaz» ("Process and equipment for storing mechanical energy by compression and quasi-isothermal expansion of a gas") was filed in year 2010 under the publication WO 2010/128222 A2. This innovation proposes to overcome the two disadvantages exposed above of heating and cooling of the gas by the thermal contact of the working gas with a medium offering a high thermal inertia, which can allow a compression and a quasi-isothermal expansion of the gas. However, despite the expected advantage of various innovations, a new constraint is emerging, this time of an economic nature.

By year 2020, the investment Capex of all pressurized tanks at 100-150 bar is at least 500 Euros per kWh of recoverable mechanical compression energy. However, the investment Capex of the reference storage method, Li-Ion batteries, has fallen from 1,000 Euros per kWh of energy stored in year 2010 to less than 300 Euros per kWh in year 2020, with a trend that remains strongly downward in Capex.

Technical Solution

Unlike all previous hydropneumatic storages that store mechanical potential energy under high pressures, thermoelectric storage offers the important advantage that the stored energy capacity, measured in Joule or kWh, is not proportional to the volume of expensive pressurized tanks. This feature includes also devices where, as in the object of the invention, the conversion to and from electricity into Cold and Hot to be stored is carried out by means of a working fluid in pressurized tanks. The approach of abandoning the use of pressurized tanks as mere mechanical energy storage and instead using them to convert mechanical energy into heat displacement and then store this thermal energy into a dipole of cold and hot heat reserves made of inexpensive materials such as saltwater ice and hot water is therefore economically promising.

During the twenty-first century, many thermoelectric storage devices have recently been presented. Most of these systems, based on continuous refrigerant working fluid circuits, convert mechanical energy into thermal reserves and then convert this thermal energy into mechanical energy by the mandatory use of three or four machines with multiple rapid movements of a turbine or piston, operating in the gas or supercritical phase for at least two of them, compressor and turbine. These machines are expensive, fragile of use imposing for this reason overheating and overcooling of the working fluid, and of poor yields (less than 60% for each direction of conversion), while, by dispensing with such machines, a quasi-reversibility and yields close to 80% for each direction of conversion are expected from the device object of the invention.

Different from device object of the invention, there is at least one thermoelectric storage design from Switzerland and South Korea, published in 2012 under DOI 10.1016/j.energy.2012.09.057, which uses sophisticated small cylinders and valves with "liquid pistons" animated by many fast and reciprocating movements. This design, which uses a hydraulic fluid subjected to the pressure of a working fluid, provides a technical solution by eliminating two machines operating in purely gaseous or supercritical phase. These small cylinders with "liquid pistons" are innovative elements belonging to a conventional continuous cycle circuit of the refrigerant. The sequence consisting of an expansion and then a contraction of the working fluid is carried out rapidly and continuously by a conventional recirculation circuit of the refrigerant working fluid, of the heat pump type in heat production or extraction mode, and of the heat engine type in mechanical heat conversion mode, conventionally exploiting in both modes large pressure variations in different areas of the circuit. In addition, this process requires sprinkling droplets of a liquid in an attempt to heat/cool the working fluid during the compression/expansion inherent in all thermodynamic conversions based on closed refrigerant circuits, which generates problems of corrosion and dissolution of the working fluid in this sprinkled liquid. In the device object of the invention, this sequence consisting of an expansion and then a contraction of the working fluid is carried out on the contrary in a relatively slow pattern, quantitatively limited in mass (non-circulating and non-continuous), by the variation of volume dedicated to the working fluid, at similar pressures in all zones, in the pressurized tanks that contain this working fluid. In addition, the use of sprinkling droplets of a liquid is not mandatory because it is replaced by the use of different heat exchange systems, which can operate simultaneously with the movement of hydraulic fluid in these tanks. The thermoelectric storage system object of the invention is mechanically much simpler and probably closer to the conditions of thermodynamic reversibility, and therefore of a higher efficiency, than the technical solution with "liquid pistons" previously published.

The device object of the invention is constituted—by at least two main pressurized tanks, abbreviation MPT, said MPT of Thermodynamic Work for one, and said MPT of Hydraulic Transit for one other, each hermetically containing at least one propellant fluid not-deemed to be lost and sharing at least one hydraulic fluid moving between them in an opposite manner via at least one liquid communication equipped with at least one hydroelectric conversion machine such as a pumping assembly or turbining assembly, —by a heat exchange system exchanging with the propellant fluids comprising at least one evaporator connected to one or more heat sources and at least one condenser connected to one or more heat absorbers/sinks. The device also presents the additional characterizations—that the thermodynamic sequence consisting of an expansion and then a contraction of each of the propellant fluids is carried out in a relatively slow, discontinuous manner, quantitatively limited in mass, by the variation of the volume which contains them in the large MPT, and not at high speed and continuously as in conventional circuits of recirculation of working fluid, —that the propellant fluids either work by alternating state changes of at least two states among the three liquid, gaseous, supercritical states, or work exclusively in the supercritical state by large alternating variations in their supercritical density—and that the pressure of the propellant fluid within the MPT of Hydraulic Transit is quasi-constant and close to the minimum value encountered in the range of pressures covered by the propellant fluid within the MPT of Thermodynamic Work.

It is specified that the many energy storage devices where a working fluid works exclusively in the gas phase, as well as those less numerous where a working fluid works in liquid-gaseous states in open circuit and is lost, such as nitrogen or liquefied compressed air, have been proposed in the past and differ from the scope of the invention.

The many devices where a working fluid works without being lost in the Liquid-Gaseous, or Liquid-Supercritical, or Gaseous-Supercritical, or Supercritical states, using a circuit of continuous recirculation of the working fluid capable of regenerating the variations in density of this fluid, constitute the well-known family of heat pumps and refrigeration machines, or the well-known family of many closed-circuit refrigerant heat engines (e.g. organic Rankine cycle, transcritical cycle, Kalina cycle, Brayton cycle, Hirn cycle, etc.), as well as the family of more complex energy storage devices combining several components of the 2 previous families. All these devices with continuous recirculation circuit of the working fluid have been proposed in the past and differ from the field of the invention.

It is specified that the device will most often work in a single stage, but that if higher pressures were to be desirable, it is possible to chain the elements of the device in the form of a multi-stage device. In this multi-stage configuration, by providing multiple pumping or turbining assemblies, as well as intermediate pressurized tanks if required by hydroelectric conversion technologies, the hydraulic fluid pressure as well as the working pressure of the propellant fluid can be raised well above those of a single pumping or turbining configuration.

Alternating heat inputs and extractions, for example to hot or cold heat reserves, are necessary for contractions and expansions of the propellant fluid in the volume of MPTs. Heat exchange systems including a condenser are in contact with the propellant fluid of the MPT of Thermodynamic Work to extract heat from the fluid during the pumping period of hydraulic fluid and after it. Heat exchange systems including an evaporator are also required to provide heat to this propellant fluid prior to and during the turbining period of the hydraulic fluid. These heat exchange systems must obviously be built robustly enough to withstand the high pressures at which the propellant fluids work. Through the use of pumps, valves or other specific activators, these heat exchange systems are put into operation either manually or automatically according to the different scheduled periods of operation. Heat exchange systems will either be placed inside pressurized tanks or placed outside these tanks. They may consist of conventional multi-fluid exchangers, and/or insertions of conductive materials such as aluminum, copper, carbon, etc. and/or heat pipes, and/or any other means of heat exchange.

To allow the hydraulic fluid to be stored at the low pressure of the thermodynamic cycle and not expelled to the atmosphere with a significant loss of energy during the low-pressure evaporation necessary for the production of Cold as well as during the discharge via turbining, the device object of the invention includes the important novelty of a second MPT, named MPT of Hydraulic Transit. This MPT, broadly similar to the MPT of Thermodynamic Work, also receives heat exchange systems, including a condenser and an evaporator, but unlike those of the MPT of Thermodynamic Work, this condenser and evaporator mainly exchange heat with a cold thermal reserve only, and not with the thermal dipole composed of a cold thermal reserve and of a hot thermal reserve It is specified that the desired low pressure generally corresponds to the saturation vapor pressure of the propellant fluid of the MPT of Thermodynamic Work while in the low temperature during production of Cold.

In the places where is a difference of level between the positions, buried or on the surface, of the MPT of Hydraulic Transit and the MPT of Thermodynamic Work, the first one being advantageously at an equal or higher altitude, then it is appropriate, for example by the use of two propellant fluids of different saturation vapour pressures, to reduce the pressure to which the MPT of Hydraulic Transit is subjected, by an amount equal to the pressure generated by the Hydraulic fluid column in this gradient. In the case of large drops, the low pressure required for the MPT of Hydraulic Transit can become close to atmospheric pressure and the MPT of Hydraulic Transit can then be simplified, without loss of energy, in the form of a simple reception basin for the hydraulic fluid. In this very peculiar topography, can be omitted from the device: the propellant fluid, evaporator and condenser of the MPT of Hydraulic Transit, itself being reduced to an atmospheric basin.

According to an autonomous mode of operation specific to thermoelectric storage, the heat extracted or brought to the propellant fluid of the MPT of Thermodynamic Work at the heat exchange systems may mainly results from a contribution or extraction of heat to the hot or cold thermal reserves integrated into the device object of the invention.

In a different mode of operation, external hot thermal sources or external cold thermal sources are supplied to the main device, e.g. in the form of solar thermal energy, or availability of ice, water or cold air, or availability of steam, water or hot air, or natural or artificial geothermal energy, or wasted heat energy from third party processes, etc. and perform, at the heat exchange systems, the major amount of the exchange with the heat extracted and brought to the propellant fluid of the MPT of Thermodynamic Work, via one or more heat transfer fluids, or via a direct heat exchange in contact with the propellant fluid, or via one or more open loops of water or air. In addition, such exchange may take advantage of ancillary refrigeration equipments removing heat, or heating from combustion of waste or biomass, or of the recovery of industrial flue gases, or of the disposal of mineral masses or cold or hot metal masses, or of the disposal of industrial effluents or urban sewerage effluents or of the availability of seas, lakes, rivers, or underground aquifers of natural or artificial origin, etc. These cold or hot external thermal sources are used either to improve the thermodynamic efficiency of thermoelectric storage operations, or to directly increase the level of thermal energy of the cold and hot thermal reserves integrated into the device, or to allow the invention to become a direct producer of electricity. It should be noted that, when it is used as a source, the ambient environment can constitute a cold source or can alternatively constitute a hot source.

Operation using combinations of the external modes and the autonomous heat exchange mode described above is also possible.

It is also interesting, concerning the hydraulic fluid of the device, to think about recovering the exergy of the heat stored by the latter because of the inevitable energy losses by friction, estimated at about 10% of the work at each way, during pumping and turbining. Regardless of its desired equilibrium temperature, this hydraulic fluid will warm up by a few degrees Celsius by increasing its sensible heat intrinsic to each pumping and turbining and will return part of its intrinsic sensible heat when it brings this heat to the propellant fluid.

The number, exchange surface and specific power of heat exchange systems shall be broadly dimensioned to ensure that the massive extraction and input of heat causes the thermodynamic state change(s) of the propellant fluids. In the event that a propellant fluid works exclusively in its supercritical state, significant extraction and input of heat are also required.

Care shall be taken to select a choice of propellant fluids, chemical substances, or mixtures of chemical molecules, whose saturated vapour pressure, at the maximum temperatures encountered in pressurized tanks, is not higher than the maximum pressure allowed by these tanks.

Examples of low-cost propellant fluids that can satisfy this operating condition in a multiphase or supercritical state are carbon dioxide ($CO_2$), which has a saturated vapour pressure at 30 degrees Celsius of about 72 bar, and ethane ($C_2H_6$), whose saturated vapour pressure at 30 degrees Celsius is about 47 bar. Also interesting are mixtures consisting of a main propellant fluid and including small percentages of other chemical molecules, such as a mixture of carbon dioxide with hydrocarbons, with nitrogen compounds or with alcohols.

In the case of using carbon dioxide as a propellant fluid, it is anticipated that one or more secondary pressurized tanks can assume the additional role of sequestration-storage of excess amounts of carbon dioxide ($CO_2$), which in gaseous form is a greenhouse gas. In addition, as the device requires significant exchanges of thermal energy at each sequence of extension and contraction of the propellant fluid, it may be interesting, to decrease thermal inertia, to heat or cool early, in secondary pressurized tanks, and by various internal and external means including those mentioned above, excess quantities of the propellant fluid to physically substitute all or part of these surpluses with equivalent masses of the regular propellant, at optimum moments of the sequence.

In the Liquid-Gaseous mode, thanks to the massive extraction and supply of heat, the propellant fluid will change state on the Enthalpy-Pressure diagram of the selected propellant fluid, in Liquid-Gaseous equilibrium as a function of the volume of hydraulic fluid cohabiting with it in the pressurized tanks and according to the heat brought to, or extracted from, this propellant fluid. The propellant fluid of the MPT of Thermodynamic Work, subjected to significant heat extraction during the period of energy storage by pumping hydraulic fluid, will undergo condensation in the liquid phase, and will therefore finally occupy a reduced volume. This liquefaction of the propellant fluid brings the important advantage of allowing almost the entire pressurized tank to be used for the movement of hydraulic fluid. This liquefaction of the propellant fluid offers the second important advantage that the propellant fluid of the MPT of Thermodynamic Work being subjected to a significant heat input prior to and during the turbining period of the hydraulic fluid, this propellant fluid will return from the liquid state to the gaseous state at its saturated vapor pressure and will expel the hydraulic fluid at a constant pressure.

As an example of operation including the supercritical state, this benefit of a greatly increased density, contraction close to the density in the liquid phase, is also found after a strong cooling. Similarly, expansion at constant pressure and an extreme increase in volume are also possible during a large heat supply. Above the critical point of temperature and pressure, the supercritical fluid mimics a liquid at moderate temperatures, and mimics a gas at high temperatures.

In most cases, propellant fluids will benefit from the addition of one or more dedicated secondary pressurized tanks communicating with MPTs through one or more lines. The insertion of valves between the tanks makes it possible to isolate these secondary pressurized tanks and optionally to help regulate the pressure prevailing in these tanks, thus helping to control the desired condensation-liquefaction and evaporation temperatures of the propellant fluids (in Liquid-Gaseous states) or contributing to control the physical conditions of the fluid in supercritical state. Moreover, with the aim of homogenizing the propellant fluid by displacement, it is interesting to optionally equip several pipes above with forced convection mechanisms between secondary tanks and MPTs. Regarding the voluntary expansion of the propellant fluid to create low temperature cold, it is specified that some optional piston(s) or turbining(s) equipment can recover mechanical energy. Note that the addition to the device of at least one secondary tank is mandatory if one wishes to operate the device with more than one propellant fluid non-simultaneously, the secondary tank (s) hermetically isolating the unused propellant fluid(s).

An improvement may be made to the device in that, in order to limit the risk of dissolution of the propellant fluid(s) in the hydraulic fluid, this dissolution being detrimental to the stability of its mass in the device and detrimental to the proper functioning of the pumping or turbining hydroelectric conversion machines, a mobile physical separation can be inserted between the hydraulic fluid and the propellant fluid(s). This separation can be achieved for example by the confining of the hydraulic fluid, or by the confining of the propellant fluid, by means of a flexible sealed sheet, for example in the form of a central bladder with radial extension or a membrane installed in a plane secant of the main tanks, or by the double confining of the hydraulic fluid and the propellant fluid by means of two different flexible sheets, or by incorporating a specific floating separation fluid on the surface of the hydraulic fluid, or by a sealed piston, or by a floating material. It is also possible to increase the pH of the hydraulic fluid or dissolve additives to reduce the dissolution of the propellant fluid. In addition, a mobile physical separation shall also be provided between propellant fluids if several propellant fluids are to be operated simultaneously in one of the MPTs.

An additional device may be brought to the main device, improvement by which masses of heat transfer fluids or hydraulic fluid, having exchanged heat with the aforementioned heat exchange systems during periods of storage and energy production, are immediately stored in several volumes differentiated according to their cooler or warmer temperature. This differentiation allows a better exchange efficiency during the successive exchanges of these heat transfer fluids with the aforementioned heat exchange systems. This also makes it possible to exploit the availability of various temperatures to optimize uses such as the conversion of thermal energy into electricity, refrigeration, air conditioning, heating or the production of hot water for third-party users (urban districts, IT servers, hotel compounds, hospitals, supermarkets, industries, etc.).

In addition, these differentiated volumes, as well as the cold or hot heat reserves incorporated in this thermoelectric storage device, can make use of different phase change materials (MCP) in liquid-solid phases (paraffin, fatty acids, inorganic MCPs, eutectic MCPs, aqueous mixture in liquid-solid states, ice, solidified salt water, etc.) to increase the energy density of storage by use of latent heat generated by change of state.

In addition, apart from the operation of evaporators and condensers, it can advantageously be exploited a mutual and synchronous heat exchange between two different masses of propellant fluid belonging to the same thermodynamic cycle, one requiring reheating and the other requiring cooling. This diabatic situation arises for example, in the use of heat pumps, as in the use of heat engines, on the occasion of the two opposite isochoric or quasi-isochoric branches of thermodynamic cycles. This heat can also be used, synchronously or after short-term storage, to preheat the propellant fluids whenever necessary, for example before the hydraulic fluid pumping period in order to obtain a higher temperature during the production of heat. Similarly, it is advantageous to temporarily store low-temperature heat transfer fluids from heat exchange systems to cause selective cooling of the propellant fluid beforehand. Note that the ambient environment or cold or hot external thermal sources can be used for the same preheating or cooling purposes of the propellant fluid.

Another diabatic situation concerns a part of the junction on the right side between the low and high pressure isobars of the thermodynamic cycle. Rather than performing adiabatic or isentropic compression or expansion, common from cycles with conventional compressors or conventional turbines working in gas or supercritical phase, the device object of the invention enjoys full freedom to extract or bring heat during the course of this compression or expansion. By the use of an optional heat exchanger related to the MPT of Thermodynamic Work, supported by an auxiliary mechanism of recirculation of the propellant fluid through this MPT, it is possible to extract or bring heat to the propellant fluid even as it undergoes a contraction or extension. For example, it is possible, even in transcritical cycles, to have large diabatic segments corresponding to compressions or expansions carried out at constant set temperatures chosen by the operator, for example at the maximum temperature authorized by the device.

In the case of pluralities of the device (cluster) it may be advantageous to communicate among each others, by additional pipes equipped with valves and possibly pumps, all or part of the elements of the devices such as MPTs, secondary pressurized tanks, heat exchange systems, differentiated compartments of heat transfer fluids, pumping or turbining assemblies, receiving basins, cold heat reserves, hot thermal reserves, etc., with the aim of flexibility, redundancy and thermal efficiency.

In the case of pluralities of the devices (cluster) it is possible to work them in time-shifted ways, such as in phase opposition, to stabilize the value of the charging power or of the restitution power, thus partially compensating, vis-à-vis the unit devices, the discontinuous character of each sequence of expansion and contraction of the propellant fluid. During these plural operations in a time-shifted manner, it is also advantageous to satisfy the needs of heat inputs and heat extractions of the unitary devices so that the inputs of one correspond in part to the extractions of the other.

The device object of the invention operates alternately by relatively long periods of pumping or turbining, and not by a continuous circulation cycle of multiple rapid compression-expansion of a small amount of a refrigerant circulating rapidly in a closed-loop-circuit heat pump or closed-loop-circuit heat engine. In addition, the propellant fluid of the device subject to the innovation works in a quantitatively limited mass manner and does not benefit from the continuous recirculation offered by conventional circuits. However, it can be seen that, when we disregard the time differences, the paths of these two opposing solutions can remarkably coincide on the Enthalpy-Pressure diagram of the selected refrigerant. The propellant fluid(s) are also refrigerants in their own capabilities. For example, the commercial code for carbon dioxide (CO2) used as a refrigerant is R744, and is R170 for ethane (C2H6) used as a refrigerant. In both cases of operation, either in a quantitatively bounded manner in mass or of operation in a recirculation circuit, there is transformation of mechanical energy (here transformation of the pumping energy) to move heat from a cold source to a hot source. In both cases, the coefficient of performance (COP) of Cold or Hot, obtained relative to the mechanical work specifically consumed, is generally greater than unity, reaching values of 3 or more depending on the value of the step for the low or for the high temperature targeted. It is likely that the device object of the invention benefits from a coefficient of performance much higher than heat pumps and than conventional refrigeration machines because the multiple rapid movements of the conventional compressor in the gas or supercritical phase, of efficiency less than 70%, is here replaced by the work of hydraulic machines offering slow volumetric expansions and contractions, expected almost reversible. Performance coefficients close to 8 are aimed-for, depending on the desired low and high temperature levels.

An additional device can be installed to improve heat transfer, whereby the upper portion of part of the pressurized tanks is equipped with systems for spraying and dropping by gravity droplets of propellant fluids or droplets of hydraulic fluid, present at the bottom of pressurized tanks or stored in other tanks. Other physical techniques for improving heat transfer such as trays, packings or other means known in the distillation industry are also possible.

An improvement can be made to the main device to avoid having to completely depressurize the pressurized tanks to atmospheric pressure during inspections and internal interventions after the first commissioning, this depressurization causing a reversal of elongations and increased fatigue of materials. This improvement consists, rather than using a single closure, to close the pressurized tank(s) by means of an airlock, an enclosure equipped with two watertight closing systems. Thus, the tank or tanks can be left under a pressure of a few bars during inspections or internal interventions by means of drones and robots, or even by means of people equipped with autonomous or rigid diving suits. This airlock will also lend itself to be used as a slow decompression chamber, should a lengthy human intervention require it.

Benefits Brought Forward

In return for a lower compactness of its component dedicated to energy conversion power, the device offers at least two specific qualities of simplicity and quasi-reversibility compared to systems previously exposed.

Moreover, the device uses selected elements from proven disciplines such as—energy storage by pumped hydroelectric storage of mountain areas, —high-pressure sealed reservoirs, in particular gas pipelines and underground artificial caverns, —the principles of heat displacement by refrigerants, —the principles of heat engines, —and thermal storage of Cold and Hot.

In addition, the device object of the invention makes use of fluids which, unlike the use of cryogenic air or nitrogen, are selected to change Liquid-Gas-Supercritical states (or to achieve large density variations in the Supercritical state) at temperatures close to ambient temperatures, or at temperatures and pressures compatible with the field of pumping & turbining hydroelectric.

Finally, in situations where external cold or hot sources are available, those can be used either to improve the energy efficiency of the desired energy storage or to allow the invention to become a net energy producer.

BRIEF DESCRIPTION OF DRAWINGS

The accompanying drawings illustrate the invention.

FIG. 1

FIG. 2

FIG. 29 represents in section, a variant of this device in a configuration where the pressurized tanks are constituted by artificial underground caverns.

FIG. 3

FIG. 4

FIG. 5

FIG. 6

DESCRIPTION OF REALIZATION MODES

Figure 1:
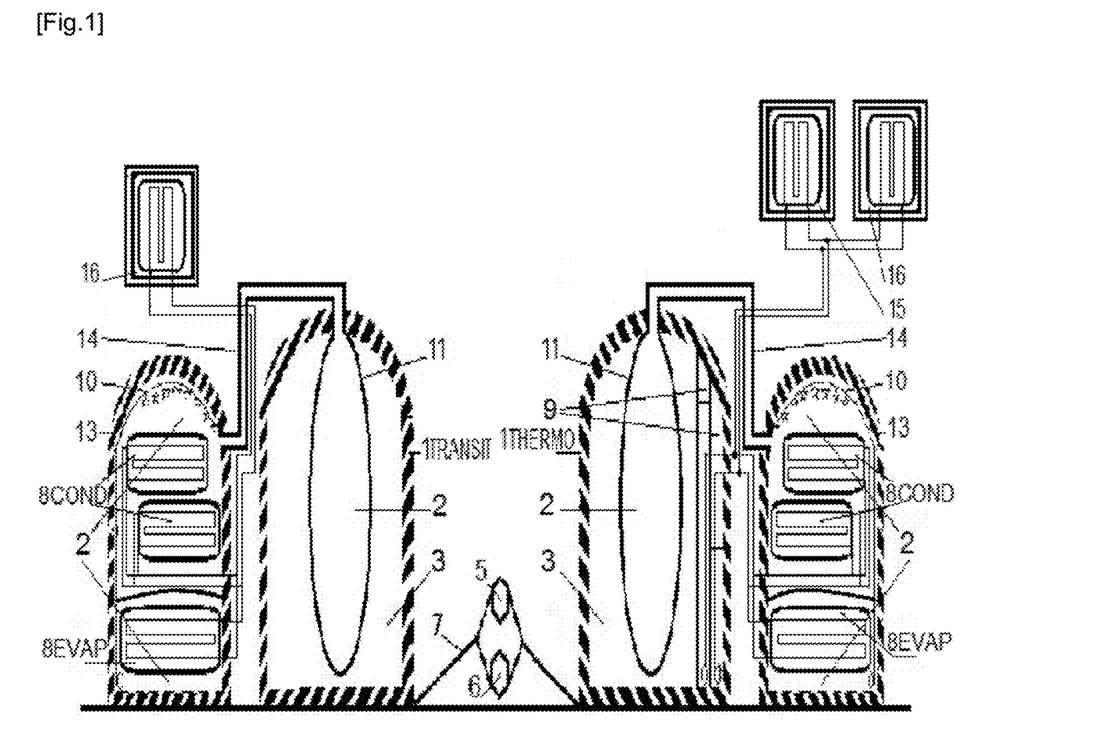
FIG. 1 represents in section, the device of the invention in a configuration where the pressurized tanks are placed above the ground.
Figure 2:
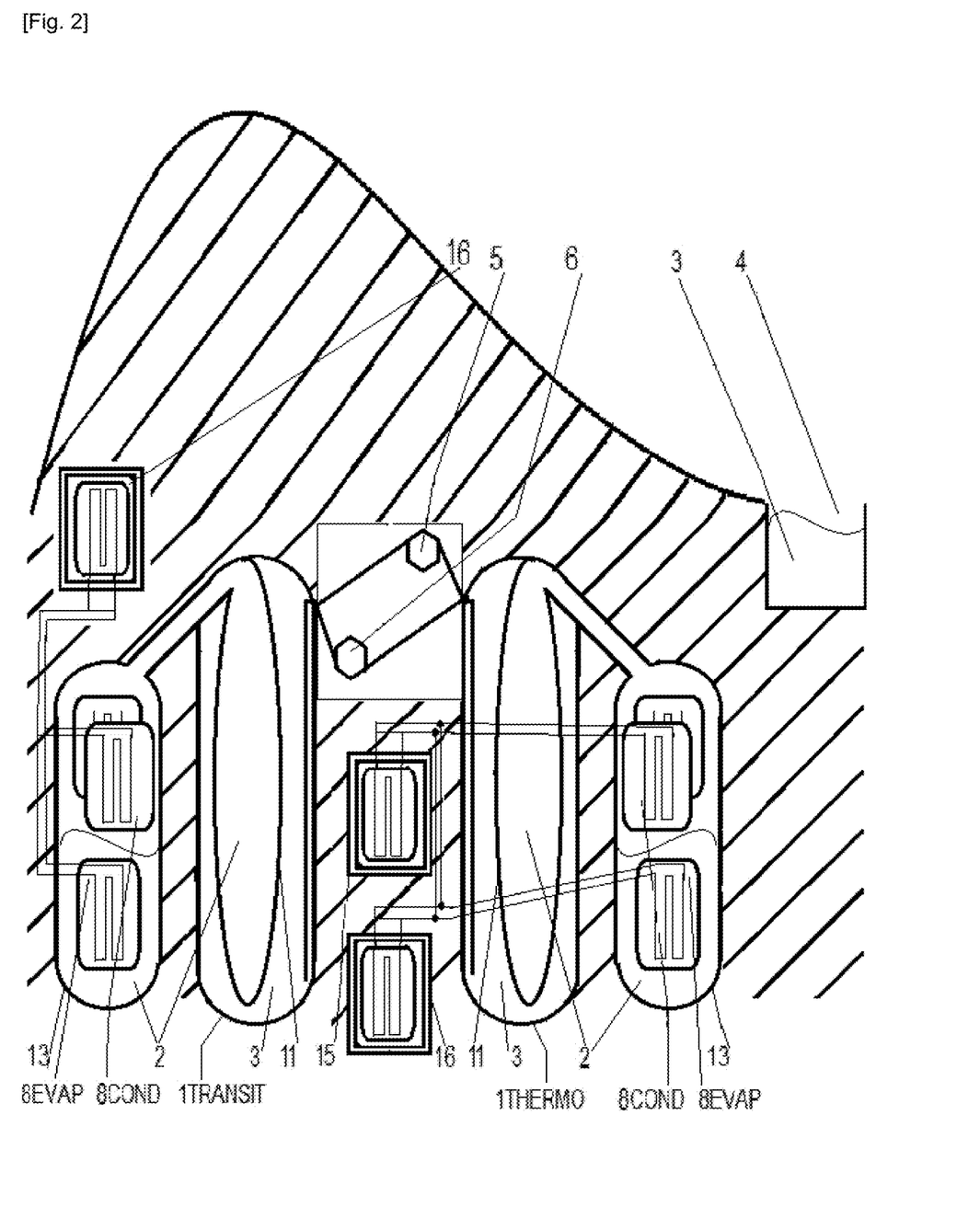
Figure 3:
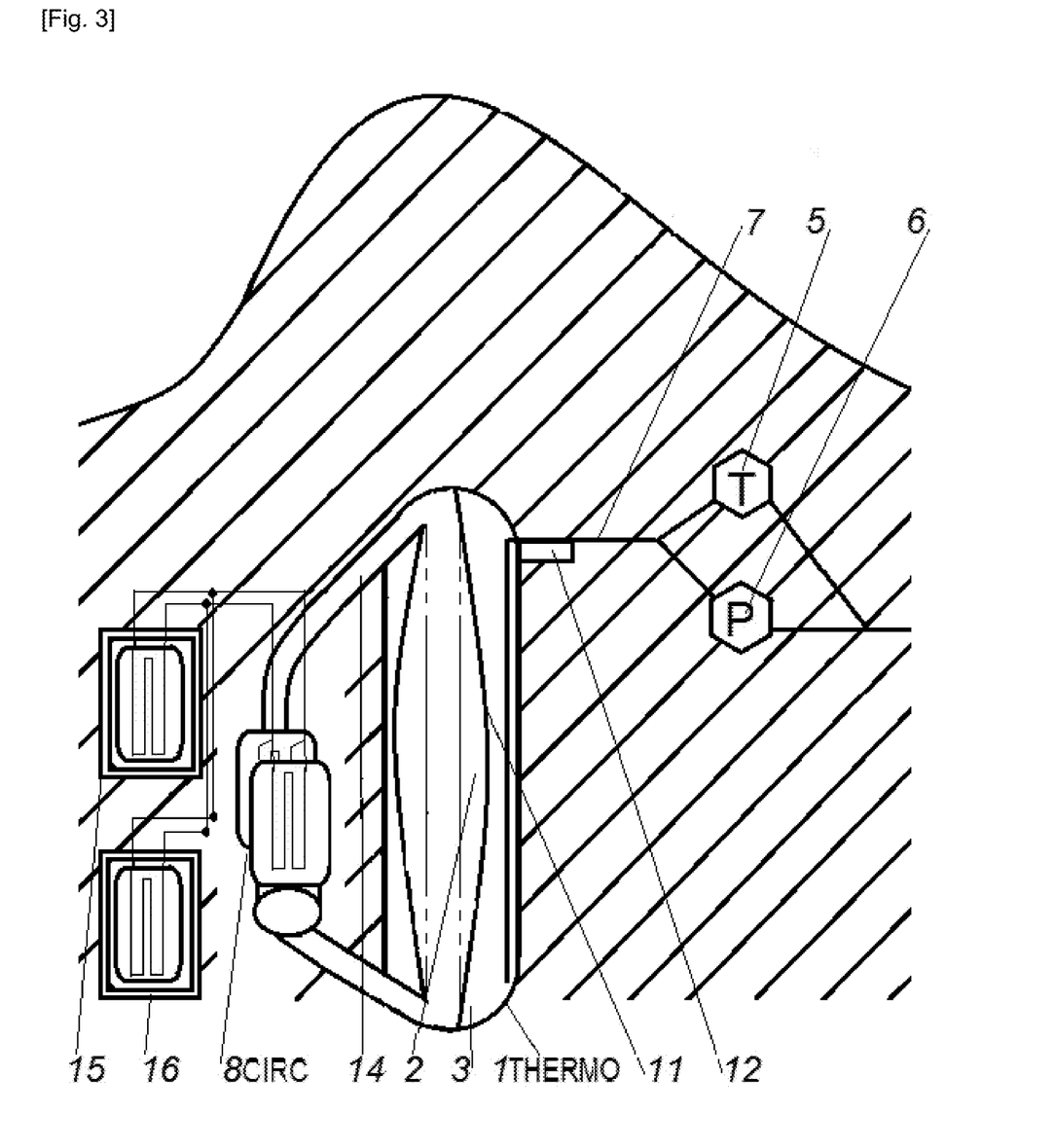
FIG. 3 represents in section, the detail of a Thermodynamic Work MPT equipped with an external heat exchange system including an optional mechanism of recirculation of the propellant fluid through the MPT and where the condenser and evaporator of the MPT are not shown.

With reference to the first 3 drawings FIG. 1, FIG. 2 and FIG. 3, the device comprises at least one Thermodynamic Working MPT (1THERMO) and a Hydraulic Transit MPT (1TRANSIT), each containing at least one hydraulic fluid (3), and at least one propellant fluid (2), comprises at least one liquid communication (7) equipped by at least one hydroelectric conversion machine (5) (6) and comprises at least two heat exchange systems (8COND) (8EVAP) in contact with the propellant fluid (2).

With reference to these drawings, the device may also comprise, a reception basin (4) of the hydraulic fluid (3) replacing the MPT of Hydraulic Transit in the event of a significant difference in level between the basin and the MPT of Thermodynamic Work, may also comprise external heat recirculation exchangers (8CIRC) of the propellant fluid (2) through the MPT of Thermodynamic Work (1THERMO), several differentiated compartments (9) to store, according to their colder and warmer temperatures, the possible heat transfer fluid(s) circulating in contact with heat exchange systems (8COND) (8EVAP) (8CIRC). The device generally includes hot thermal reserves (15) or cold thermal reserves (16), in particular to carry out thermoelectric storage, and concerning cold thermal reserves (16), to achieve the low pressure stability of the MPT of Hydraulic Transit (1TRANSIT). The device may include pressurized secondary tanks (13) dedicated to propellant fluids (2), necessarily connected to MPTs by means of pipes (14). The device may also include, in the upper portion of the tanks (1THERMO) (1TRANSIT) (13) systems for spraying and dropping droplets by gravity (10) of propellant fluid (2) or of hydraulic fluid (3). The device may also include one or more mobile physical separations (11) between the hydraulic fluid (3) and the propellant fluid(s) (2). The closure of the pressurized tanks (1THERMO) (1TRANSIT) (13) of the device can be carried out by means of an airlock (12).

Figure 4:
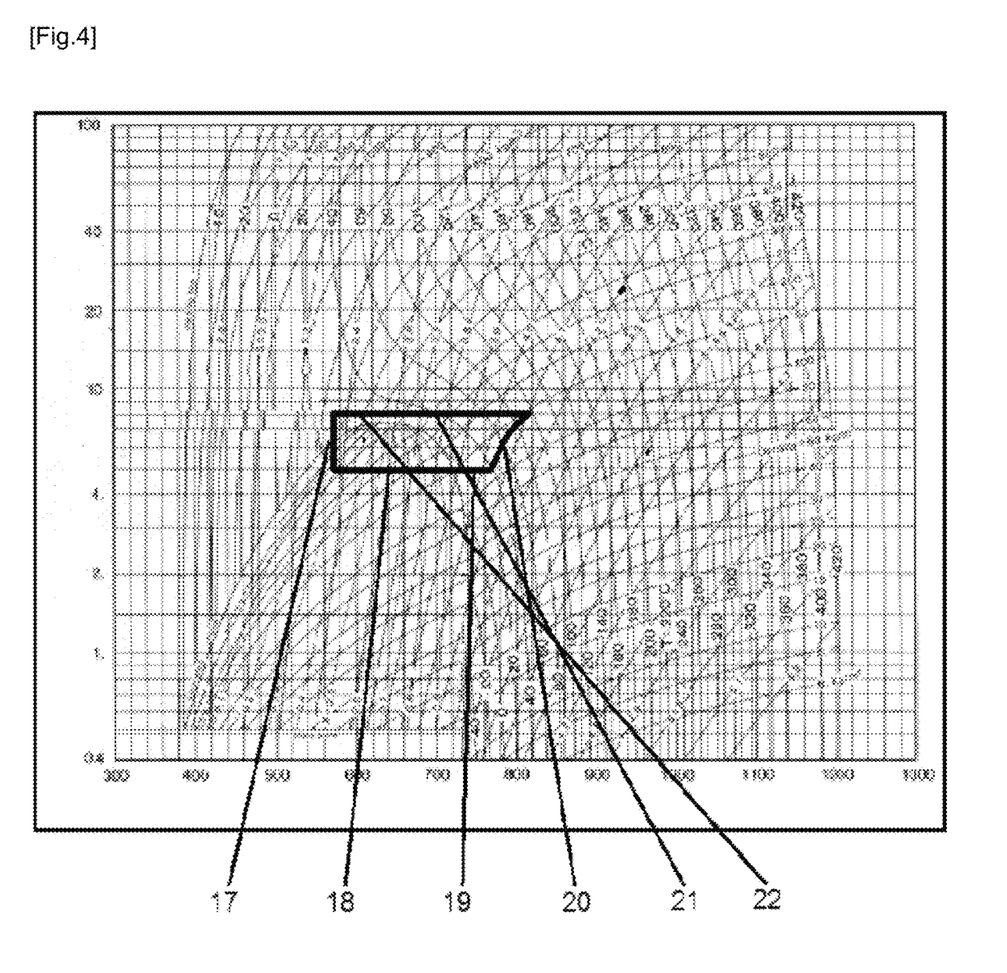
FIG. 4 represents on an Enthalpy-Pressure diagram an illustration of one of the possible thermodynamic operating modes of the device, here in a 3-state mode Liquid-Gaseous-Supercritical, and in the particular case where the propellant fluid is carbon dioxide (CO2). The horizontal x-axis indicates the enthalpy variations of the carbon dioxide in kJ/kg and the vertical y-axis indicates the pressure to which this fluid is subjected, in MPa.

With reference to the first drawing using here the Enthalpy-Pressure diagram of carbon dioxide, named FIG. 4, one generates in this example similar to conventional operation of a Heat Pump function consuming electrical energy, a strong expansion (17) to reach the temperature of the Cold that one wishes to recover, then one carries out an evaporation at almost constant temperature and pressure (18) to produce the Cold to be stored. Subsequently, since it is often desirable to also produce heat at high temperature at a later time, the dry gas is preheated (19) by adding heat from the ambient environment, or from an external heat source, or from the residual heat of the previous operations (22). In a subsequent step, one will cause a strong compression (20) of the propellant fluid (2) up to the pressure which will set the maximum temperature of the desired Hot, then one will carry out in supercritical state a significant extraction of heat at almost constant pressure which will cause an extreme contraction of volume (21) of the propellant fluid (2). At the end of the contraction, the heat extraction recovers only low-temperature heat (22), nevertheless interesting to be store temporarily to achieve the preheating (19) of the propellant fluid (2) of the next operation. It is remarkable to note on this diagram the possible superposition of the discontinuous working periods of the propellant fluid (2) of the device with the visualization of the recirculation steps of the working fluids of conventional heat pumps and conventional refrigeration machines. A thermodynamic cycle rotating in the opposite direction would be the cycle of a Heat Engine function, depleting for example the cold (16) and hot (15) thermal reserves to return electricity.

Figure 5:
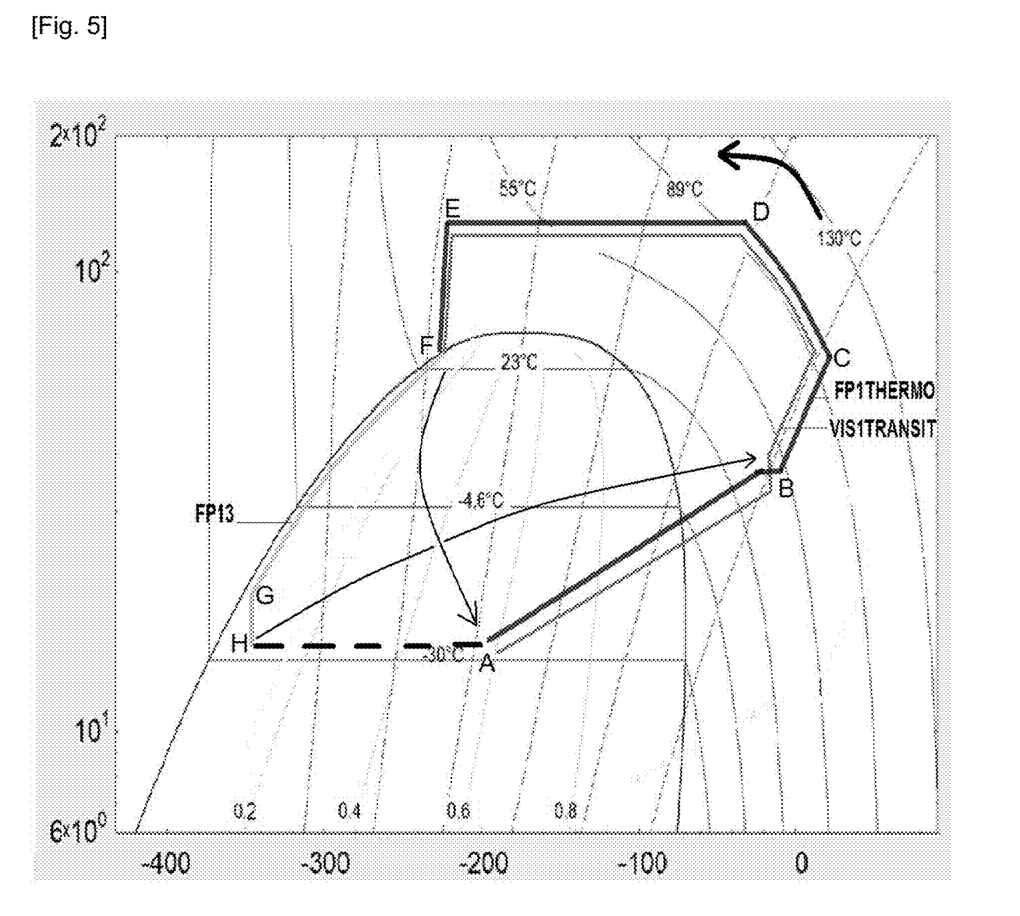
FIG. 5 represents on an Enthalpy-Pressure diagram an illustration of a possible thermodynamic operation of the device in a Heat Pump function, here in the particular case where the propellant fluid is carbon dioxide (CO2). The horizontal x-axis indicates the enthalpy variations of the carbon dioxide in kJ/kg and the vertical y-axis indicates the pressure to which this fluid is subjected, in hecto kiloPascal.

With reference to the second drawing using here the Enthalpy-Pressure diagram of the carbon dioxide, named FIG. 5, in this example of counterclockwise operation corresponding to the function of Heat Pump to store electrical energy in thermal form, the FP13 plot reproduces the states of the propellant fluid (2) in secondary pressurized tanks (13), the FP1THERMO plot reproduces the states of the propellant fluid (2) in the MPT of Thermodynamic Work (1THERMO) and the VIS1TRANSIT plot allows to visualize the transfers of the hydraulic fluid (3) between the 2 MPT (1THERMO) (1TRANSIT), without reproducing the states of the propellant fluid (2) in the MPT of Hydraulic Transit (1TRANSIT), these states being quasi-constant, at low temperature and at low pressure. Note that in the isochoric branch of highest value (on the right side), it is advisable to heat the cold and gaseous propellant fluid (2) located in the MPT of Hydraulic Transit (1TRANSIT), now devoid of hydraulic fluid (3) as a result of the hydraulic pumping of the previous cycle, by using the desirable cooling of the dense propellant fluid (2) located, hot in quasi-isochore, in the secondary pressurized tanks (13) of the MPT of Thermodynamic Work (1THERMO). For this purpose, during section AB an additional counter-current warming-cooling heat exchanger, not shown in the figures, is used between these two masses of propellant fluid (2). To succeed in this essential thermal operation, the entire mass of gaseous and cold propellant fluid (2) is transferred entirely via this additional exchanger, thanks to a mechanical transfer of hydraulic fluid (3) by a low-power pump and hydraulic line, between the MPT of Hydraulic Transit (1TRANSIT) and the MPT of Thermodynamic Work (1THERMO), originally completely filled with hydraulic fluid (3) as a result of the hydraulic pumping of the previous cycle. Without this sequential transfer, this mutual heat exchange would be impossible under conditions of quasi-reversibility. The BC section illustrates a partial isentropic compression. The CD section illustrates an interesting and unusual extraction of heat at maximum temperature during diabatic compression. The DE section illustrates a classic production of Hot by isobaric heat extraction in the supercritical phase thanks to the use of the condenser (8COND), located at high pressure. The EF section illustrates cooling to the dense (or liquid) state of the propellant fluid (2). Section FG illustrates the cooling of propellant fluid (2) in secondary pressurized tanks (13). The GH section illustrates a classic isenthalpic expansion to lower the temperature of the propellant fluid (2) to its minimum. The HA section illustrates an isobaric evaporation for the production of cold thanks to the evaporator (8EVAP), located at low pressure. It is important to note that a second voluntary permutation of the two MPTs (1THERMO) (1TRANSIT) must necessarily be performed between point F and point A.

Figure 6:
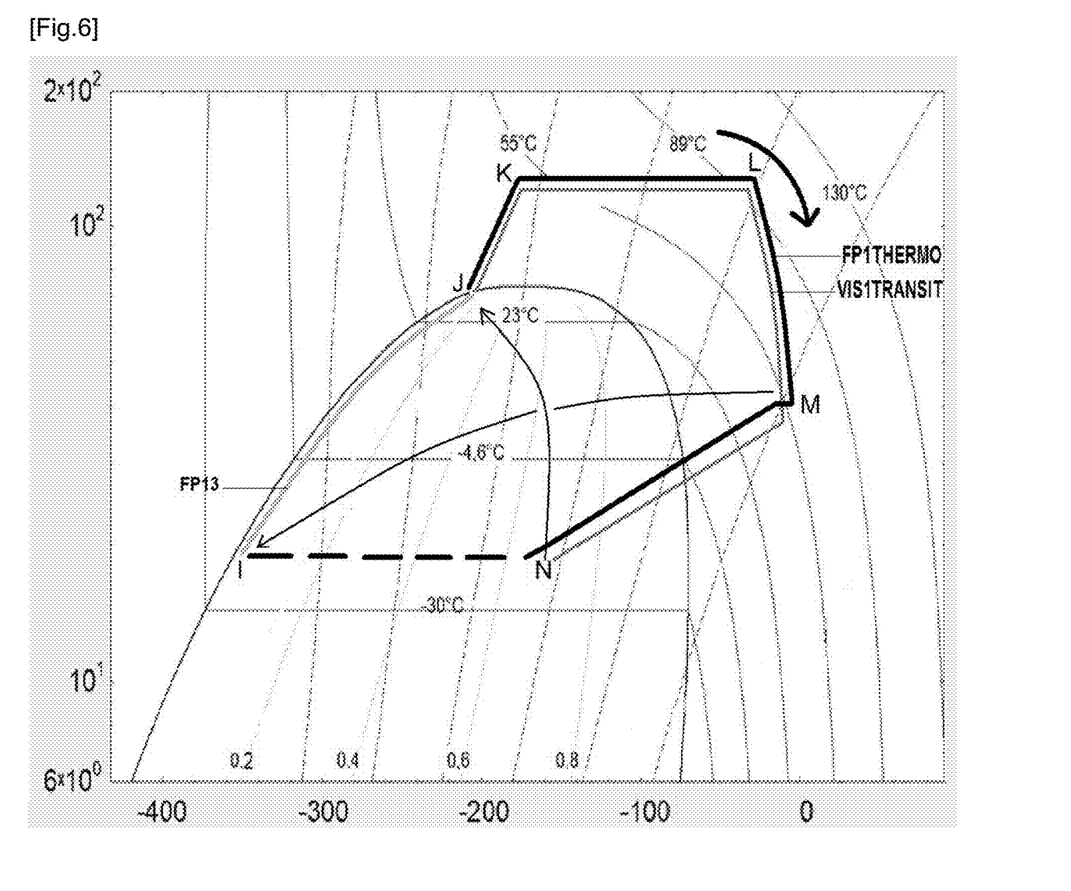
FIG. 6 represents on an Enthalpy-Pressure diagram an illustration of a possible thermodynamic operation of the device in a function of Heat Engine, here again in the particular case where the propellant fluid is carbon dioxide (CO2). The horizontal x-axis indicates the enthalpy variations of the carbon dioxide in kJ/kg and the vertical y-axis indicates the pressure to which this fluid is subjected, in hecto kiloPascal.

With reference to the third and last drawing using here again the Enthalpy-Pressure diagram of the carbon dioxide, named FIG. 6, in this example of clockwise operation corresponding to the function of Heat Engine restituting electrical energy, the FP13 plot reproduces the states of the propellant fluid (2) in the secondary pressurized tanks (13), the FP1THERMO plot reproduces the states of the propellant fluid (2) in the Thermodynamic Work MPT and the VIS1TRANSIT plot allows to visualize the hydraulic fluid transfers (3) between the 2 MPT (1THERMO) (1TRANSIT), without reproducing the states of the propellant fluid (2) in the MPT of Hydraulic Transit (1TRANSIT), these states being most often constant, at low temperature and at low pressure. Note that in the isochoric branch of highest value (on the right side), it is advisable to cool the hot and gaseous propellant fluid (2) located in the MPT of Thermodynamic Work (1THERMO), devoid of hydraulic fluid (3) as a result of hydraulic turbining, from the desirable reheating of the dense propellant fluid (2), cold in quasi-isochore, contained in secondary pressurized tanks (13). For this purpose, during section MN the counter-current warming-cooling heat exchanger, mentioned in the previous paragraph, is used between these two masses of propellant fluid (2). To succeed in this essential thermal operation, the gaseous and hot propellant fluid (2) is completely transferred via this additional exchanger, thanks to a mechanical transfer of hydraulic fluid (3) by a low-power pump and additional hydraulic lines, between the MPT of Thermodynamic Work (1THERMO) and the MPT of Hydraulic Transit (1TRANSIT), originally completely filled with hydraulic fluid (3) as a result of the hydraulic turbining of the previous cycle. Section IJ illustrates this reheating of the propellant fluid (2) in the secondary pressurized tanks (13). The JK section illustrates a supercritical reheating. The KL section illustrates a supercritical isobaric heating and expansion of the propellant fluid (2), thanks to the evaporator (8EVAP) located at high pressure and thanks to heat consumption from, for example, the hot thermal reserve (15). The LM section illustrates a diabatic expansion, interesting and unusual, because not classically isentropic, to provide more work thanks to an additional supply of heat. The MN section illustrates the isochoric cooling on the right side mentioned above. The NI section illustrates a contraction of the propellant fluid (2) through a heat extraction at the condenser (8COND) located at low pressure, extraction which will cause a consumption of the cold thermal reserve (16). It is important to note that a second voluntary permutation of the two MPTs (1THERMO) (1TRANSIT) must necessarily be performed between point N and point J.

EXAMPLES

A first example of operation concerns, according to FIG. 2, and for the mode of the two Liquid-Gaseous states, the thermal storage of electrical energy. The device carries out a main period of pumping of hydraulic fluid (3), a period driven by several valves not shown in the figures. The pumping assembly (6) driven by the external energy to be stored pushes the hydraulic fluid (3) at low pressure from the MPT of Hydraulic Transit (1TRANSIT) to the MPT of Thermodynamic Work (1THERMO) via liquid communication ducts (7), thus decreasing in the MPT of Thermodynamic Work (1THERMO) the volume occupied by its propellant fluid (2). The latter, simultaneously subjected to intense heat extraction thanks to heat exchange systems (8COND) (8CIRC) intended for the production of heat, starts to condense at its saturated vapor pressure, increases in overall density, then will change into the liquid phase occupying a reduced volume, triggering at this moment the end of the pumping period. In the alternative where, working at higher high pressure, the propellant fluid (2) would have reached its supercritical state, it would increase sharply in density during the extraction of its heat, would occupy a reduced volume, and as in the subcritical alternative, would let the hydraulic fluid move-in (3). The sequence of thermodynamic cycles includes isochoric heat exchanges and two successive permutations of the 2 MPT (1THERMO1) (1TRANSIT), allowing the production of Cold as explained in FIG. 5 and its description.

A second example of operation concerns, according to the same FIG. 2, and for the mode of the two Liquid-Gaseous states, the electrical restitution of stored thermal energy. During the turbining period, a period driven by several valves not shown in the figure, the propellant fluid (2) of the MPT of Thermodynamic Work (1THERMO), simultaneously subjected to an intense heat input from the hot thermal reserve (16) thanks to heat exchange systems (8EVAP) (8CIRC) will change from the liquid state to the gaseous state, and will thus expel at its saturated vapor pressure to the MPT of Hydraulic Transit (1TRANSIT) the hydraulic fluid (3) from this MPT of Thermodynamic Work (1THERMO) via the liquid communication ducts (7) and via the turbining assembly (5) which thus recovers the stored energy. In the alternative where, working at higher high pressure, the propellant fluid (2) would have reached its supercritical state, it would decrease sharply in density during the heat input, occupy a much larger volume, and as in the subcritical alternative, expel-out the hydraulic fluid (3). The sequence of thermodynamic cycles includes isochoric heat exchanges and two successive permutations of the 2 MPT (1THERMO) (1TRANSIT) and causes a consumption of the cold thermal reserve (16) as explained in FIG. 6 and its description.

An observation which confirms that we are in the presence of propellant fluids (2) working quantitatively bounded in mass, and not in the presence of a heat pump with continuous recirculation circuit, is that, in the absence of physical permutation of equipment, the production of Cold and Hot will not be able to persist beyond the complete change of state of the propellant fluids (2) (or beyond the maximum variation in density of the propellant fluid, in the case of operation in supercritical state).

It is specified that to achieve the restitution of stored electricity, it is necessary to equip the device with a cold thermal reserve (16) integrated into the device (storage by sensible heat, or by latent heat or thermochemical storage). The Cold produced during the periods of expansion of the propellant fluid (2) after compression is therefore stored in the cold thermal reserves (16) of this thermoelectric storage. This storage requires the use of one or more masses of liquid or solid matter, including salt water in the liquid or solid state, preferably organized according to differentiated temperatures, possibly including thermocline tanks or different depth of the Earth's soil. The amount of Cold produced is, in the case of CO2 used as propellant fluid, about 5 times greater than the amount of electrical energy stored.

Similarly, to benefit of the thermal dipole of electrical restitution, it is necessary to equip the device with a hot thermal reserve (15) integrated into the device (storage by sensible heat, or by latent heat or thermochemical storage). The produced Hot is therefore thermally stored in the hot thermal reserves (15) of this thermoelectric storage, during periods of compression of the propellant fluid. This storage requires the use of one or more masses of liquid or solid matter, preferably organized according to differentiated temperatures, possibly including thermocline tanks or different depth of the Earth's soil. The amount of heat produced is, in the case of $CO_2$ used as propellant fluid, about 5 times greater than the amount of electrical energy available.

As a third example of operation, it is notable that in the situations already described by which external cold or hot sources become available, the device can achieve a net production of mechanical energy over a complete round trip sequence of contraction and expansion of the propellant. For example, in the case of pure $CO_2$ used as propellant fluid (2) in both the 2 MPT (1THERMO) (1TRANSIT), thanks only to the arrangement of the environment and thanks to a cold source at zero degrees Celsius, which would be applied to the condenser (8Cond) of the MPT of Hydraulic Transit (1TRANSIT), the pressure of the hydraulic fluid (3) will be about 40 Bar only, while the pressure of energy restitution at the turbining of the MPT of Thermodynamic Work (1THERMO) is about 55 Bar, which is the saturated vapour pressure of $CO_2$ heated by the evaporator (8EVAP) by ambient air or water, assuming an ambient temperature of 20 degrees Celsius. Even in this example of a modest temperature difference, a net production of mechanical energy is generated by this pressure differential equal to 15 bar.

INDUSTRIAL APPLICATIONS

The device according to the invention is intended for storage and energy conversion to store, produce or move electrical or thermal energy.

Its first industrial application is to provide an economical solution to the intermittency of intermittent renewable energies (solar and wind) feeding local and national electricity grids in increasing quantities, as part of the mitigation of greenhouse gas emissions produced by the many power plants running on fossil fuels.

A second industrial application is to provide an economical solution to the necessary decarbonization of the cooling needs and heating needs of industries and residential and tertiary buildings. In 2020, the consumption of Cold and Hot, major consumers of fossil energy, represented 40% of greenhouse gas emissions.

A third industrial application is the net generation of electricity, from the availability of a hot source or a cold source, including in situations of low temperature difference (low temperature geothermal energy, warm effluents, thermal energy from the seas) in which conventional heat engines, economically requiring deviations greater than 25° C., can not operate.

PATENTS DOCUMENTS

WO 2010/128222 A2 entitled in French Procédé et équipements de stockage d'énergie mécanique par compression et détente quasi-isotherme d'un gaz» ("Method and equipment for storing mechanical energy by compression and quasi-isothermal expansion of a gas")

NON-PATENT LITERATURE 10.1016/j.energy.2012.09.057 A2 «Transcritical $CO_2$ cycles with TES (thermal energy storage) for electricity storage».

The invention claimed is:

1. A thermoelectric device for energy storage or energy conversion, the device comprising:
    at least two main pressurized tanks which is thermodynamic work and hydraulic transit,
        wherein each of the tanks containing at least one propellant fluid and sharing at least one hydraulic fluid moving between them in an opposite manner via at least one liquid communication equipped with at least one hydroelectric conversion machine such as a pumping assembly or a turbining assembly;
    a heat exchange system, exchanging heat with the propellant fluids comprises at least one evaporator and at least one condenser; and
    a hot thermal reserve and cold thermal reserve, that is connected with the thermodynamic work tank, wherein the heat exchange system of the tank exchanges heat with both the reserves through pipes,
        wherein the hydraulic transit is connected with a separate cold thermal reserve and the heat exchange system exchange heat with the cold thermal reserve through pipes in order to maintain low pressure;
        wherein the thermodynamic sequence consisting of an expansion and then a contraction of each of the propellant fluids is carried out slowly, discontinuously, and quantitatively bounded in mass, by the variation of the volume which contains them in the large MPT, that the propellant fluids either work by alternating state changes of at least two states among the three liquid, gaseous, supercritical states, or work in the exclusively supercritical state by large alternating variations in their supercritical density, and that the pressure of the propellant fluid within the MPT of Hydraulic Transit is quasi-constant and close to the minimum value encountered in the range of pressures covered by the propellant fluid within the MPT of Thermodynamic Work.

2. The device according to claim 1, wherein the device incorporates at least one cold thermal reserve or at least one hot thermal reserve of thermal energy storage via one or more masses of liquid or solid matter, including the possibility of thermocline tanks or areas of the Earth's soil, and in that, at the heat exchange systems, the major amount of extractions of heat or inputs of heat to propellant fluids are carried-out through inputs and extractions of heat from these thermal reserves.

3. The device according to claim 1, wherein; at the heat exchange systems the major amount of extractions of heat or inputs of heat to propellant fluids are carried-out by hot or cold thermal sources external to the main device, for example in the form of solar thermal energy, or availability of ice, cold water or cold air, or availability of steam, hot water or hot air, or natural or artificial geothermal energy, or wasted heat energy of third party processes, etc.

4. The device according to claim 2 or claim 3, wherein a conjunction of different means of heat exchanges including condensers, evaporators, recirculation exchangers and physical transfers of propellant fluids via exchangers intercalated between two MPTs, allows inputs of heat or extractions of heats to these propellant fluids in all segments of the thermodynamic cycles, including in those segments carrying out the movements of hydraulic fluid.

5. The device according to claim 1, wherein masses of heat transfer fluids, or masses of hydraulic fluid, having exchanged heat with propellant fluids are temporarily stored according to their cooler or hotter temperatures in several differentiated compartments.

6. The device according to claim 2, wherein all or part of the compartments differentiated for temporary storage of fluids according to their temperatures or all or part of the thermal reserves uses Phase Change Materials, including the possibility of salt water ice, or uses an aqueous mixture slurry under the Liquid-Solid states.

7. The device according to claim 1, wherein the propellant fluids benefit from the addition of one or more dedicated secondary pressurized tank(s), communicating with the MPT by one or more pipes equipped with valves, and also possibly equipped with forced convection mechanisms, between the secondary pressurized tank(s) and these MPT.

8. The device according to claim 1, wherein the upper portion of all or part of the pressurized tank(s) is equipped with systems for spraying and dropping by gravity droplets of propellant fluid or hydraulic fluid or with other physical techniques for improving heat transfer such as trays or packings.

9. The device according to claim 1, wherein the propellant fluid are chemical substances or mixtures of chemical molecules selected to have, at the maximum temperatures encountered in the pressurized tank, saturated vapor pressures lower than the maximum pressures allowed by these pressurized tanks, such as carbon dioxide, ethane or such as mixtures of carbon dioxide with hydrocarbons, with nitrogen compounds or with alcohols.

10. The device according to claim 1, wherein all or part of the propellant fluids is heated or cooled by a heat input or heat extraction taking benefits of the high or low temperatures of fluids from a different portion of the thermodynamic cycle or of their plurality, for example by a counter-current heating-cooling exchanger between two different masses of propellant fluid, or from hot or cold fluids stored in previous operations, or exploiting an external thermal source or the ambient environment.

11. The device according to claim 1 wherein is provided means for reducing dissolutions between propellant fluids and hydraulic fluid such as mobile physical separations between these fluids, or increases in chemical pH or such as the use of additives.

12. The device according to claim 1, wherein part of the heat accumulated by the hydraulic fluid because of the inevitable energy losses by friction during the operations of the pumping assembly or of the turbining assembly is recovered, under the form of heat supplied to the propellant fluid.

13. The device according to claim 7, wherein one or more secondary pressurized tank(s) are used to perform the sequestration and physical storage of excess amounts of carbon dioxide ($CO_2$), which in gaseous form is a greenhouse gas, including optionally heating or cooling portions of this excess $CO_2$ by advance, in order to physically substitute them for equivalent masses of regular $CO_2$ used as propellant fluid, at optimal times of operations.

14. The device according to claim 1, wherein at least one of the pressurized tanks consists of a natural or artificial underground cavern or consists of an underwater tank.

15. The device according to claim 1 or claim 2, wherein at least one hydraulic transit MPT or at least one thermal reserve consists of a basin, of a river or of a natural body of water.

16. The device according to claim 1 wherein the plurality of devices form a set, the components of the devices such as MPT, secondary pressurized tanks, hydraulic fluids, propellant fluids, heat exchange systems, compartments differentiated storage of fluids according to their temperatures, liquid communications, pipes of propellant fluid, pumping assemblies, turbining assemblies, cold thermal reserves, hot thermal reserves, receiving basins are connected to each other's by pipes equipped with valves.

17. The device according to claim 1, wherein the device is used to store energy or to convert energy.

* * * * *